Dec. 29, 1942. A. EPPLER, JR 2,306,430
MACHINE FOR MOLDING SHOE BOTTOM PARTS
Filed March 22, 1941 4 Sheets-Sheet 4
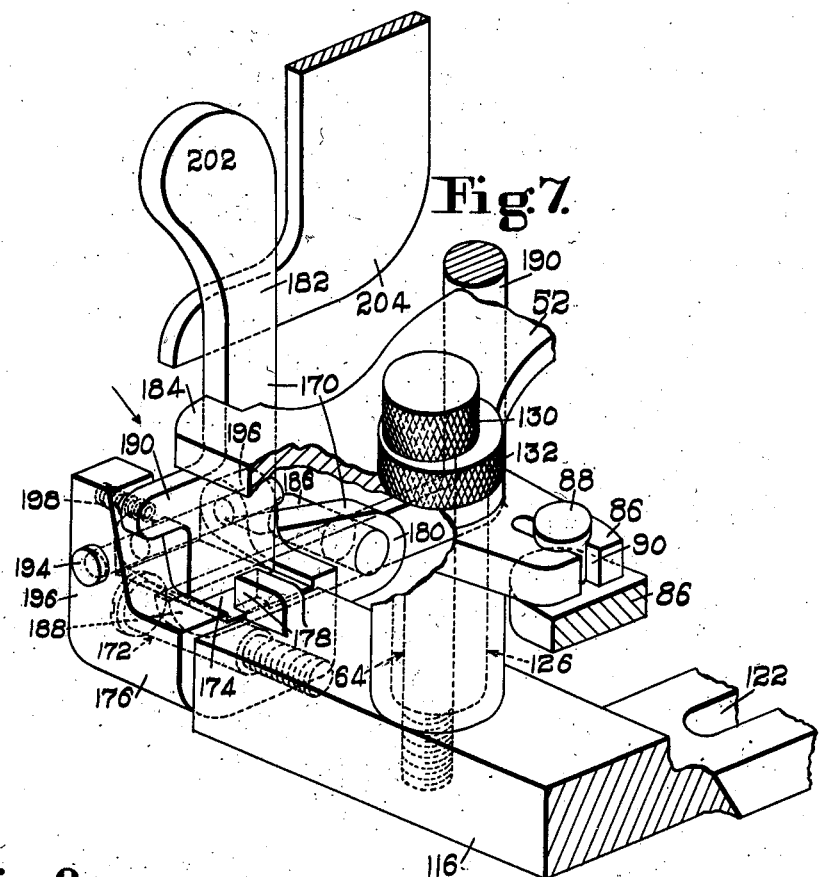
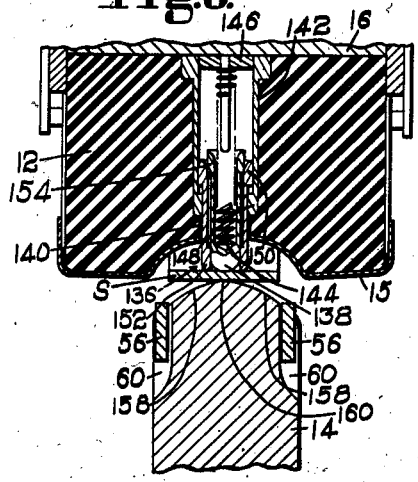
INVENTOR
Andrew Eppler, Jr.
By his attorney Patented Dec. 29, 1942

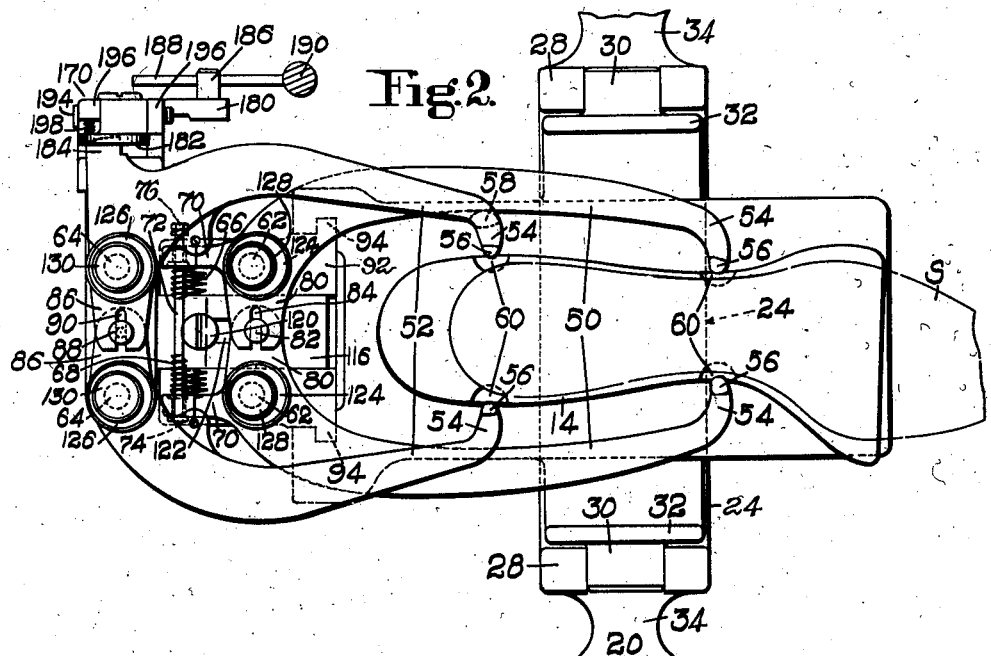

2,306,430

UNITED STATES PATENT OFFICE 2,306,430

MACHINE FOR MOLDING SHOE BOTTOM PARTS

Andrew Eppler, Jr., Lynn, Mass., assignor to United Shoe Machinery Corporation, Flemington, N. J., a corporation of New Jersey Application March 22, 1941, Serial No. 384,732

13 Claims. (Cl. 12—21)

This invention relates to machines for molding shoe bottom parts and more particularly to improvements in machines of the type disclosed in United States Letters Patent No. 2,065,465, granted December 22, 1936, upon application of J. M. Whelton. The invention is herein illustrated in its application to the molding of outsoles. The illustrated machine, however, is equally well adapted for molding insoles or for molding reinforced insole units of the type disclosed, for example, in United States Letters Patent No. 2,065,463, granted December 22, 1936, upon application of J. M. Whelton.

The molding machine disclosed in the patent referred to comprises a stationary upper pad, a lower form which is movable toward and from the pad and adapted to cooperate with the latter to mold a sole or work piece which has been placed upon the form, and gaging mechanism comprising two pairs of gages for engaging the opposite lateral edges of a sole to locate it relatively to the form.

Objects of the present invention are to insure accuracy in the operation of the gaging mechanism and adapt it to function effectively and reliably in locating soles of a wide range of shapes and sizes, to control the sole during the movement of the form toward the pad so as to insure against liability of displacement of the sole from the position determined by the gaging mechanism, and to facilitate the introduction of soles into the machine.

To the accomplishment of these objects important improvements have been made in the construction of the gaging mechanism, and a control device, herein illustrated as a spring-pressed plunger, has been provided for clamping the sole against the form and holding it securely in place until the molding operation has been completed. Means has also been provided for retracting the sole positioning gages from their closed or operative positions just prior to the completion of the cycle of operations of the machine so that they will not interfere with the placing of a new sole upon the form.

The various features of the invention will be best understood from a description of the preferred embodiment thereof illustrated in the accompanying drawings, in which Fig. 1 is a view, partially in front elevation and partially in section, of a portion of a sole molding machine embodying the features of my invention;

Figure 2 is a view, partially in plan and partially in section along the line II—II of Fig. 1, showing particularly the lower molding form and the associated gage mechanism for locating an insole relatively to the form;

Fig. 3 is a fragmentary elevational view of the left-hand end of the machine;

Fig. 7 is a perspective view of the mechanism for retracting the gage jaws; and

Fig. 8 is a section taken along the line VIII—VIII of Fig. 1 but showing the molding form in a position intermediate between the upper and lower limits of its stroke.

Figure 1:
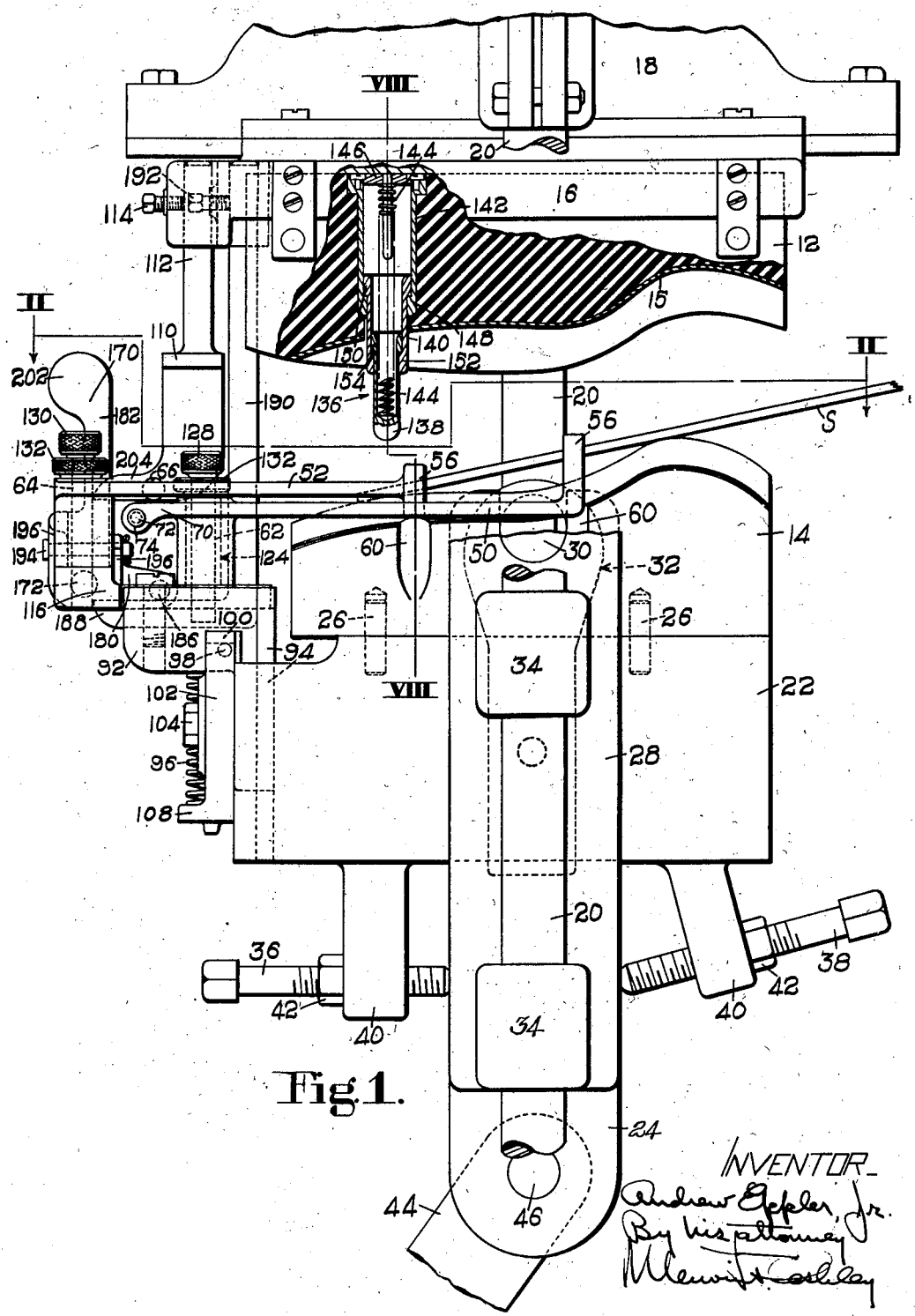

The machine illustrated in the drawings is provided with cooperating molding members comprising a yieldable upper pad 12, which may be made of rubber or similar elastic material, and a rigid lower form 14 which may conveniently be made of wood. The opposed faces of the pad and the form are shaped to impart the desired surface contour to the soles in the molding operation. The pad 12 is mounted in a pad box 16 carried by a stationary head 18 which is secured to the upper portions of two posts 20 that constitute part of the frame of the machine. As shown, the lower side of the pad is covered with a thin layer 15 of leather which engages the sole and protects the pad from wear. The form 14 is supported upon a block or presser member 22 carried by a vertically reciprocable crosshead 24 which is mounted to slide on the posts 20. The form 14 is secured in place upon its supporting block 22 by means of dowel pins 26 which are carried by the block and extend into holes in the lower side of the form. The block 22 is mounted upon the crosshead 24 (Fig. 2) with provision for a limited amount of tilting adjustment about a horizontal axis transverse to the pad and the form to insure effective engagement of the molding surfaces of the form and the pad with the work. For this purpose the crosshead is provided with two spaced uprights 28 which are forked at their upper extremities to receive studs 30 carried by ears 32 on the block. The crosshead 24 is provided with lugs 34 which are apertured to receive the posts 20 and thus to afford a sliding connection between the crosshead and posts. To facilitate effective application of molding pressure to the sole the block 22 and the form 14 may be secured in different positions of tilted adjustment about the common axis of the studs 30 by means of set screws 36 and 38 which are threaded through lugs 40 on the block and are arranged to engage opposite sides of the crosshead 24, suitable lock nuts 42 being provided to secure the set screws in adjusted position. To effect relative movement of the form 14 and the pad 12 into and out of cooperative sole molding relation, the crosshead 24 is reciprocated by a toggle mechanism comprising a toggle link 44 (Fig. 1) which is pivoted at 46 to the crosshead. The toggle mechanism just referred to is substantially the same in construction and mode of operation is corresponding mechanism disclosed in United States Letters Patent No. 1,549,243, granted August 11, 1925, upon application of E. E. Winkley, and the molding mechanism, so far as above described, is substantially like that disclosed in United States Letters Patent No. 2,065,465, hereinbefore mentioned.

Figure 4:
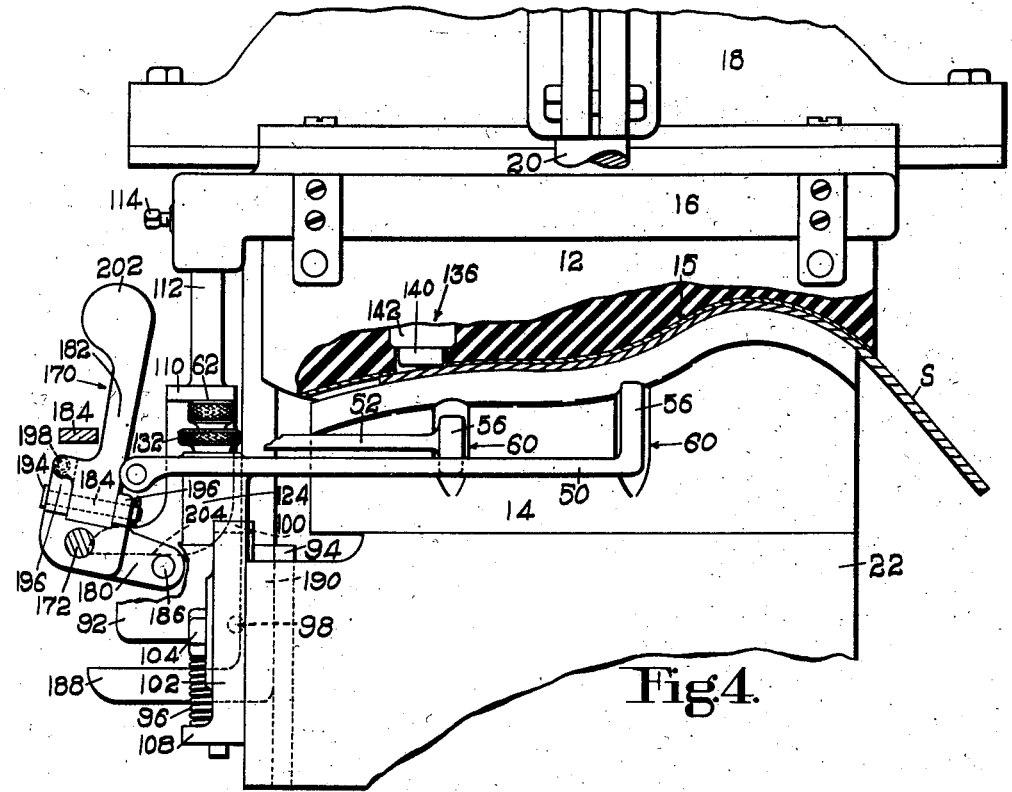
Fig. 4 is a front elevational view similar to Fig. 1 but showing the form and the pad in sole molding relation.

For the purpose of locating the sole widthwise relatively to the form 14 and the pad 12 there are provided a pair of side gages 50 and a pair of heel gages 52 for engagement with the opposite lateral edges of the sole at the shank portion and at the heel portion thereof, respectively. Each pair of gages 50 and 52 consists of two horizontally disposed jaws which are located, one at either side of the form, and are provided with inwardly curved end portions 54 (Fig. 2) terminating in lips 56 (Figs. 1 and 4) for engaging the edge of the sole. As shown, the lips 56 on the side gage jaws 50 extend upwardly therefrom while the lips 56 on the heel gage jaws 52 extend both upwardly and downwardly therefrom. The rearmost heel gage jaw is also provided, near its free extremity, with a depending lip 58 (Fig. 2) for engaging the adjacent side gage jaw 50 when the heel gage jaws are being opened, i. e., moved away from work-engaging positions, so that the opening movements of the heel gages hereinafter referred to will be communicated to the side gages. To insure that the gage lips 56 will engage the edge of a sole which is narrower than the form, the sides of the form are notched or recessed at 60 to receive the gage lips. This expedient enables a single form, which is as wide as the widest sole to be operated upon, to be employed in the molding of soles which are narrower than the form.

At the ends remote from the lips 56 the side gage jaws 50 are pivotally mounted upon individual fulcrum studs 62 while the corresponding ends of the heel gage jaws 52 are pivotally mounted upon individual fulcrum studs 64. The heel gage jaws 52 are connected with one another by a tension spring 66 (Fig. 2) that urges the jaws toward sole engaging positions. The side gage jaws 50 are urged toward sole engaging positions by means of a compression spring 68 the opposite ends of which bear against ears 70 which project beyond the pivoted ends of the jaws. The spring 68 is supported by means of a rod 72 which extends through the convolutions of the spring and through holes in the ears 70, the rod being held in place by a head 74 at one end and a nut 76 at the other. The gage jaws of each pair are connected in articulated relation by means which communicates angular motion from one jaw to the other and equalizes the movements of the jaws to enable them to centralize a sole transversely upon the form 14. The means for interconnecting the side gage jaws 50 comprises arms 80 (Fig. 2) formed as bell-crank extensions of the jaws, the outer ends of the arms being disposed in overlapping relation and being articulated by means of a pin 82 which is carried by one of the arms and slidingly engages within a slot 84 in the other arm. The heel gage jaws 52 are interconnected in a similar manner by means of bell-crank extensions or arms 86 (see also Fig. 3) one of which carries a pin 88 which extends through a slot 90 in the other arm.

The side gage jaws and the heel gage jaws are mounted upon a vertically movable carriage 92 having a tongue-and-groove connection with the block 22, as indicated at 94 in Figs. 1, 2 and 3, and the carriage is normally maintained in its highest position relatively to the block by a compression spring 96 (Fig. 3) which position is determined by the engagement of a pin 98 on the carriage 92 with a fixed abutment 100. The abutment 100 is formed upon a plate 102 which is affixed to the block 22 by means of a screw 104 which extends through a vertically elongated slot 106 in the plate 102. The spring 96 is arranged with its upper end engaging the carriage 92 and with its lower end resting upon a lug 108 formed on the plate 102. Upon loosening the screw 104 the plate 102 may be adjusted to position the gage jaws in the desired normal vertical or heightwise relation to the form. Such an adjustment may be made without effecting any change in the tension of the spring 96, inasmuch as the extent of movement of the lug 108 will be the same as that of the abutment 100. The carriage 92 occupies its uppermost position relatively to the block 22, i. e., the position in which it is shown in Figs. 1 and 3, except during the upper part of the stroke of the crosshead 24 when the upward movement of the carriage is arrested so that the lips 56 on the gage jaws will not engage the pad and thus interfere with the molding operation. The means for thus arresting upward movement of the carriage 92 and the gage jaws comprises an abutment plate 110 formed at the lower end of a rod 112 which is fixedly secured by a set screw 114 within a socket in the pad box. The abutment plate 110 is located directly above the rearmost fulcrum stud 62 for the side gage jaws and functions by engagement with the latter to arrest the upward movement of the carriage 92 and the gage jaws. The point at which the upward movement of the carriage 92 is arrested may be varied by loosening the set screw 114 and adjusting the rod 112 vertically in its socket.

The side gage jaws are fulcrumed directly upon the carriage 92 but the heel gage jaws are fulcrumed upon a slide 116 which is adjustably mounted in a horizontal guideway formed between beveled surfaces 118 (Fig. 3) in the carriage 92 and is fixedly secured in adjusted position by means of a screw 120 which extends through a slot 122 (Fig. 2) in the slide 116 and is threaded into a socket in the carriage. The slot 122 is elongated in directions lengthwise of the sole which is being operated upon so that by loosening the screw 120 the slide 116 can be moved to effect simultaneous adjustment of both heel gages relatively to the side gages in directions lengthwise of the sole for the purpose of better accommodating soles of different sizes. By means of this adjustment the location of the heel gage jaws may be varied in accordance with the size of the soles being operated upon so that the jaws will engage that portion of the sole edge at the rear of the sole which is curved in the arc of a circle whose center is coincident with the center of the heel seat of the sole. This will insure accuracy in the centering of the rear portion of the sole inasmuch as the jaws will be certain to engage the sole edge at points equidistant from the center line of the sole. With the heel gage jaws thus adjusted they will also be spaced a maximum distance from the side gage jaws with the result that the proper angular relation of the sole to the form will be more accurately determined. By locating the heel gage jaws so that they will engage the curved rear edge of the sole at points located rearwardly of the center of curvature of that edge, as indicated in the drawings, the heel gage jaws, even though retracted from operative positions when a sole is being placed by the operator upon the form, will serve as means for determining the proper location of the sole lengthwise of the form inasmuch as the operator, after a little experience, will have no difficulty in spotting the correct location of the sole with reference to the lips of the heel gage jaws. Soles may thus be located lengthwise of the form without the use of a separate end gage. By properly adjusting the slide 116 on which the heel gage jaws are mounted the latter may be adjusted lengthwise of the form 14 in accordance with the size or length of a particular sole so that the jaws will function in the lengthwise positioning of the sole to insure that after the sole has been molded contours will be properly related to the sole lengthwise of the latter. This will insure, for example, that the break line between the shank and the forepart of the sole will be accurately located.

The lower ends of the fulcrum studs 62 are threaded into the carriage 92 and the lower ends of the fulcrum studs 64 are threaded into the slide 116. The studs 62 and 64 are provided with sleeves or bushings 124 and 126, respectively, upon which the hubs of the gage jaws are mounted. The bushings 124 are confined between knurled heads 128 on the studs 62 and the upper side of the carriage. The bushings 126 are confined between knurled heads 130 on the studs 64 and the upper side of the slide 116. The outer surfaces of the bushings are eccentric to the inner surfaces thereof and the eccentric bushings are provided with knurled heads 132 (Fig. 3) by means of which they may be rotatably adjusted when the respective fulcrum studs have been loosened. By turning the eccentric bushings 124 and 126 the fulcrums of the side gages 50 and the heel gages 52 may be adjusted to rectify machine discrepancies such, for example, as inaccurate shaping or subsequent bending or twisting of the gage jaws. By adjustment of the bushings 124 and 126 the gage jaws may be positioned with their work-engaging portions accurately located at points equidistant from the center line of the form 14. In this way accurate centering of the sole relatively to the form will be insured. By rotational adjustment of the eccentric bushings the work-engaging portions of the gage jaws may also be adjusted to accommodate soles that are inaccurately or unsymmetrically formed. Also, by such adjustment of the eccentric bushings, in machines embodying two sets of molding members, the gages associated with one set may be adjusted to accommodate right soles while those of the other set may be adjusted to accommodate left soles. After adjustment of the eccentric bushings 124 and 126 the respective fulcrum studs are tightened to clamp the bushings in adjusted positions.

To prevent displacement of the sole after it has been positioned by the gage jaws 50 and 52 a holddown 136 (Figs. 1 and 8) is provided consisting of a spring-pressed plunger which normally projects from the lower or operative face of the pad into position to engage the heel portion of the sole and press or clamp it firmly against the form before any portion of the sole has been brought into contact with the pad. The holddown or plunger 136 comprises two tubular sections 138 and 140 arranged to telescope one within the other, a tubular casing 142 within which the outer plunger section or sleeve 140 is adapted to telescope, and a spring 144 the upper end of which bears against a cap plate 146 on the casing and the lower end of which is seated upon the closed lower end of the inner plunger section 138. The casing 142 is confined within an opening in the pad 12 and its lower portion is thickened internally at 148 to cooperate with the exteriorly thickened upper portion 150 of the outer plunger section 140 to limit downward movement of that section. The lower portion of the outer plunger section 140, in turn, is thickened interiorly at 152 to cooperate with the exteriorly thickened upper portion 154 of the inner plunger section 138 to limit downward movement of the latter.

As already indicated, the spring plunger 138 acts as a holddown to clamp the work against the form 14 prior to the application of molding pressure or the engagement of any portion of the work with the pad 12. The plunger 138 holds the sole against any tendency of the pad to skew the sole and cause it to slip or shift in a lateral edgewise direction relatively to the form. The plunger 138 also controls the position of the sole, holding it clamped firmly against the form after the upward movement of the carriage 92 and the gage jaws has been arrested and during the subsequent brief period while the sole is being raised above the lips 56 of the gage jaws and is therefore temporarily uncontrolled by the latter. The action of the plunger 138 is particularly useful when the soles are to have a substantial amount of transverse curvature imparted to their shank portions. For use in molding such soles the shank portion of the form may be shaped with sloping surfaces 158, 158 at opposite sides of a central ridge 160, as best shown in Fig. 8, the shape being such as to impart a so-called cottage-roof formation to the shank portion of the sole. As will appear from Fig. 8 the sole S has been raised above the gage jaws but is held clamped against the form by the holddown 136 and thus held securely against any tendency to become skewed or to slip sidewise while being brought into engagement with the pad.

It will be noted that the pad 12 and the form 14 have complemental curved molding surfaces constructed and arranged to impart a longitudinally arched formation to the shank portion of a sole which has been introduced between them, that the heel gage jaws 52 are located rearwardly of these curved molding surfaces, and further that the plunger 138 is located rearwardly of the points of engagement of the heel gage jaws 52 with the sole. This arrangement of the plunger 138 insures that the clamping of the sole by the plunger against the form will be accomplished without any bending or deforming of the sole or any shifting of the sole relatively to the gage jaws such as would tend to skew the sole or cause it to creep or slip relatively to the form and thus to interfere with proper shaping of the sole by the form and the pad. Such skewing or slipping of the sole would be very likely to occur if, for example, the plunger were located between the heel gages and the shank gages where its engagement with a flat sole, such as the sole S shown in Fig. 1, would press the shank portion of the sole downwardly where it bridges the curve in the corresponding portion of the form, thus curving the sole into at least partial conformity with the curve of the form and almost invariably skewing the sole so that after having been molded it would be misshaped and would not accurately conform to the curve of the last with which it is intended to be used.

The means for retracting the gage jaws from sole-engaging positions after a sole has been molded and for holding the gage jaws retracted while the machine remains at rest between successive molding operations comprises an actuator in the form of a bell-crank lever 170 which is mounted for rocking movement about a horizontal pivot stud 172 that projects from the rear of the slide 116, the rocking movement of the lever being in a vertical plane extending lengthwise of the machine and being limited in both directions by engagement of a flat surface 174 (Fig. 7) on the hub 176 of the lever with a lug 178 on the slide 116. The bell-crank lever 170 comprises a relatively short arm 180 by means of which the lever is rocked to retract the gage jaws and a relatively long upright arm 182 which moves the gage jaws by contact with one side of a rearwardly extending lug 184 on the rear heel gage jaw 52.

In the operation of the machine, as the bell-crank lever 170 is moved bodily downward with the crosshead 24 and the carriage 92 after the molding operation has been performed, the bell-crank lever is rocked in a counterclockwise direction (viewed from the front of the machine) by the engagement of a pin 186 carried by the short arm 180 of the lever with the upper edge of a fixed abutment 188 in the form of a horizontal arm extending from the lower end of a rod 190 which depends from the pad box 16. As shown, the upper end of the rod 190 is secured in a socket in one end of the pad box by means of a set screw 192 which may be loosened to permit vertical adjustment of the abutment 188. During this movement of the lever the long arm 182, which then engages the right-hand side of the lug 184 on the rear heel gage jaw 52, swings that jaw outwardly against the action of the spring 66 and holds it in retracted position. The outward or retracting movement of the rear heel gage jaw is communicated to the front heel gage jaw through the pin-and-slot connections 88, 90 between the extensions 86 of the two heel gage jaws. The outward movement of the rearward heel gage jaw 52 is communicated to the rear side gage jaw 50 by the engagement of the downwardly extending lip 58 on that heel gage jaw with the inner side of the rear side gage jaw. Outward movement of the rear side gage jaw 50 is communicated to the front side gage jaw through the pin-and-slot connections 82, 84 between the extensions 80 of the side gage jaws.

While the gage jaws are held in retracted positions by means of the bell-crank lever 170, a sole is placed by the operator upon the form and, in order that the gage jaws may then be released so that they may be moved by their springs into positions to engage and locate the sole upon the form, the long or upright arm 182 of the bell-crank lever 170 is mounted for a limited amount of tilting movement relatively to the rest of the lever in a vertical plane extending transversely of the machine, i. e., for tilting movement toward and from the operator. For this purpose the long arm 182 is mounted upon a pivot pin 194 which extends at right angles to the pivot stud 172, the ends of the pin 194 extending through upstanding ears 196 on the hub 176. The arm 182 is urged forwardly or toward the operator by a spring 198 one end of which bears against a lug 190 on the arm and the other end of which is received in a socket in an upward extension of one of the ears 196. Forward movement of the upright arm 182 under the influence of the spring 198 is limited by the engagement of a surface 200 (Fig. 3) at the lower end of the arm with the flat surface 174 at the upper side of the hub 176. The above-described tilting movement of the arm 182 enables the arm to function as a latch for holding the gage jaws in retracted positions. The upper extremity of the arm or latch 182 is enlarged, as shown at 202, so that it may readily be engaged by the operator's finger and pushed backwardly to effect the release of its latching action.

Figures 5, 6:
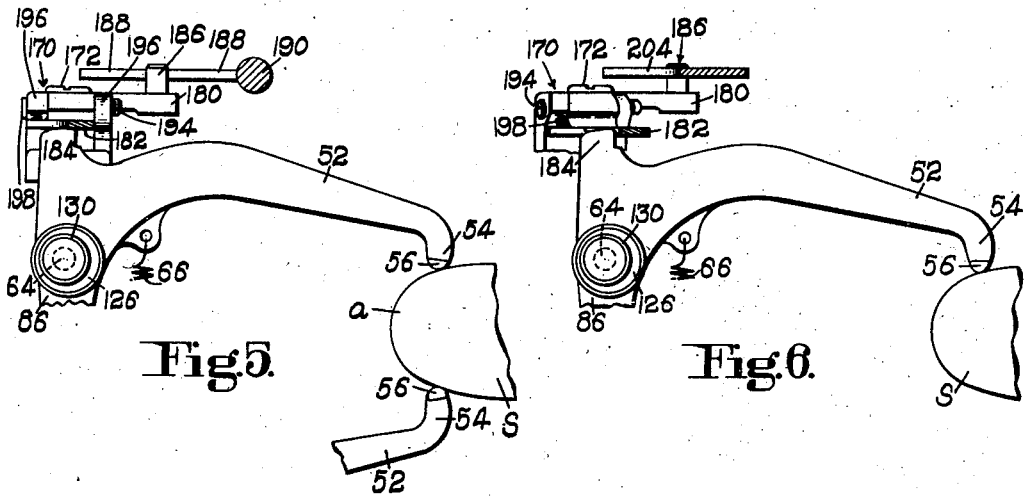
Fig. 5 is a plan view of one of the heel gage jaws together with associated mechanism for retracting the gage jaws.
Fig. 6 is a view similar to Fig. 5 but showing a different position of the mechanism for retracting the gage jaws.

When the machine comes to rest at the end of a cycle of operations the parts occupy the positions shown in Figs. 1, 2, 3 and 7, the form 14 having been lowered and the compound bell-crank lever 170 with its long arm yieldingly held in a forwardly tilted position by the spring 198 having been rocked counterclockwise about its pivot stud 172 into a vertical position wherein it engages the right-hand edge of the lug 184 and functions as a latch to hold the gage jaws in retracted or open positions. With the gages thus retracted the operator places a sole to be molded upon the form 14. He then releases the gages by manually pressing backwardly upon the enlarged upper end 202 of the bell-crank-lever arm 182, thus tilting the arm backwardly, relatively to the rest of the lever, into the position shown in Fig. 5, and thereby disengaging the arm from the side of the lug 184. The gage jaws are now released to the action of the springs 66 and 68 which close the jaws until the lips 56 engage the opposite lateral edges of the sole and position the sole widthwise relatively to the form. As the rear heel gage jaw 52 moves inwardly toward the sole the rear edge of the lug 184 swings into position in front of the latch arm 182, as also shown in Fig. 5, and holds the arm pressed against the action of the spring 198. Before the bell-crank arm 182 can operate again to retract the gage jaws it must be rocked in a clockwise direction far enough so that when pressed forwardly by the spring 198 it can engage the right-hand edge of the lug 184 and this movement of the arm is effected, during the upward movement of the cross-head 24 and the carriage 92, by the engagement of the pin 186 on the short arm of the lever 170 with the lower edge of a fixed abutment plate 204 formed as a laterally offset downward extension of the abutment plate 110 hereinbefore mentioned. This clockwise rocking movement of the bell-crank lever swings the long lever arm or latch 182 toward the right until it clears the end of the lug 184 whereupon the spring 198 functions to tilt the latch arm 182 forwardly into the position in which it appears in Fig. 6. The arm 182 is now ready to function to retract the gages when the bell-crank lever is subsequently rocked in a counterclockwise direction.

As already explained, the counterclockwise rocking movement of the bell-crank lever is effected upon the downward movement of the crosshead 24 and the carriage 92 by the engagement of the pin 186 on the short arm of the bell-crank lever with the upper edge of the fixed abutment 188.

The gages are retracted from operative positions just before the completion of the downward movement of the form 14 so that the machine comes to rest at the end of its cycle of operations with the gage jaws held in open or retracted position where they will have no tendency to interfere with the introduction of a new sole into the machine.

Having described my invention, what I claim as new and desire to secure by Letters Patent of the United States is:

1. In a sole molding machine, a sole molding form, a pair of side gages interconnected for equalized movements toward and from one another for centering the shank portion of a sole relatively to the form, a pair of heel gages interconnected for equalized movements toward and from one another for centering the heel portion of the sole relatively to the form, said side gages and said heel gages being adjustable heightwise of said form, and means for effecting simultaneous adjustment of said heel gages lengthwise of the form relatively to said side gages.

2. In a sole molding machine, a molding form, a pair of sole positioning jaws fulcrumed for pivotal movements toward and from the form and arranged to engage opposite lateral edges of the shank portion of a sole on the form, a second pair of sole positioning jaws fulcrumed at points spaced rearwardly from the fulcrums of the first-mentioned jaws for pivotal movements toward and from the form and arranged to engage the lateral edge of the heel portion of the sole at opposite sides of the longitudinal center line of the sole, means interconnecting the jaws of each of said pairs for equalized movements, and means for effecting simultaneous adjustment of the members of one of said pairs of jaws lengthwise of said form to accommodate soles of different sizes.

3. In a sole molding machine, a molding form, a pair of side gage jaws for positioning a sole on said form, spaced bearings relatively adjustable widthwise of said form upon which said jaws are mounted for pivotal movements toward and from the form, a pair of heel gage jaws for co-operating with the side gage jaws in positioning the sole, spaced bearings relatively adjustable widthwise of said form upon which said jaws are mounted for pivotal movements toward and from the sole, said side gage jaws and said heel gage jaws being arranged to engage respectively the edges of the shank portion and the edge of the heel portion of the sole at opposite sides of the longitudinal center line of the sole, means interconnecting the jaws of each of said pairs for equalized movements toward and from the form, and means for simultaneously adjusting the bearings of the heel gage jaws toward and from the bearings of the side gage jaws.

4. In a sole molding machine, a molding form, a pair of sole positioning jaws fulcrumed for pivotal movements toward and from the form and arranged to engage opposite lateral edges of the shank portion of a sole on the form, a second pair of sole positioning jaws fulcrumed at points spaced rearwardly from the fulcrums of the first-mentioned jaws for pivotal movements toward and from the form and arranged to engage the lateral edge of the heel portion of the sole at opposite sides of the longitudinal center line of the sole, means interconnecting the jaws of each of said pairs for equalized movements, means for relatively adjusting the fulcrums of each of said pairs of jaws, and other means for adjusting the fulcrums of one of said pairs of jaws relatively to those of the other pair of jaws.

5. In a sole molding machine, a molding form, a support for said form, two pairs of pivot studs carried by said support each of said studs having an eccentric bushing thereon, a pair of sole positioning jaws fulcrumed on the bushings on one pair of said studs, said jaws being movable toward and from said form and arranged to engage opposite lateral edges of the shank portion of a sole on the form, a second pair of sole positioning jaws fulcrumed on the bushings on the other pair of said studs, said jaws being movable toward and from the form and arranged to engage the lateral edge of the heel portion of the sole at oppositie sides of the longitudinal center line of the sole, means interconnecting the jaws of each of said pairs for equalized movements, means for rotatably adjusting said eccentric bushings to adjust the fulcrums of each pair of said jaws relatively to one another, means for securing said bushings in adjusted positions, and means for effecting simultaneous adjustment of the members of one of said pairs of sole positioning jaws relatively to those of the other pair in directions lengthwise of the molding form.

6. In a sole molding machine, a stationary pad, a block beneath said pad and movable toward and from the latter, a form carried by said block for cooperating with the pad to mold a sole, a carriage slidable vertically upon said block, a pair of pivot studs on said carriage, a pair of sole positioning jaws fulcrumed on said studs for movements toward and from the form and arranged to engage opposite lateral edges of the shank portion of a sole on the form, a slide horizontally adjustable upon said carriage, a pair of pivot studs on said slide, a second pair of sole positioning jaws fulcrumed on said studs for movements toward and from the form and arranged to engage the lateral edge of the heel portion of the sole at opposite sides of the longitudinal center line of the sole, means interconnecting the jaws of each of said pairs for equalized movements, eccentric bushings on each of said pivot studs adapted to be turned to adjust the fulcrums of said jaws relatively to one another, and means for securing said bushings in adjusted positions.

7. In a sole molding machine, a stationary sole molding pad, a form movable toward said pad to mold a sole and away from said pad into position to receive a sole to be molded, gages movable toward and from positions for locating a sole relatively to said form, and means operable during movement of said form away from said pad for retracting said gages from sole locating positions, said means comprising a manually releasable latch for holding said gages retracted when said form is in sole receiving position.

8. In a sole molding machine, sole molding members relatively movable into and out of co-operative sole molding relation, gages movable toward and from positions for locating a sole relatively to said molding members, and means operable during relative movement of said molding members out of cooperative relation for retracting said gages from sole locating positions, said means comprising a manually releasable latch for holding said gages retracted.

9. In a sole molding machine, two sole molding members, means for relatively moving said members toward and from cooperative sole molding positions, two gages connected to move in unison toward and from each other and arranged to engage the opposite lateral edges of a sole located between them to position the sole relatively to said members, means for yieldingly urging said gages toward each other, and means including a manually releasable latch operative upon relative movement of said molding members away from cooperative positions for retracting said gages from the sole.

10. In a sole molding machine, a pad, a form beneath the pad, said form being movable toward and from said pad at each cycle of operations of the machine, two gages connected to move in unison toward and from each other and arranged to engage the opposite lateral edges of a sole on the form, a spring normally operative to hold the gages against the sole, an actuator for retracting said gages from the sole comprising a latch for holding the gages retracted, said latch being adapted to be manually tripped at the start of each cycle of operations to release the gages to the action of said spring, means operative upon upward movement of said form to reset said latch, and means operative upon downward movement of the form to operate said actuator to retract said gages.

11. In a sole molding machine, a pad, a form movable toward and from said pad and adapted to cooperate with the latter to mold a sole, a pair of sole positioning gages movable toward and from the opposite lateral edges of a sole on said form and connected for equal and opposite movements, means for urging said gages toward one another for locating the sole widthwise with respect to the form, mechanism for retracting said gages from sole locating positions, said mechanism comprising a spring-pressed latch, means on one of said gages for holding said latch against the action of its spring, means operating upon movement of the form toward the pad for actuating said mechanism to effect the release of said latch, and means operating upon movement of the form away from the pad for actuating said mechanism to cause said latch to retract said gages.

12. In a sole molding machine, a sole molding pad, a presser member beneath said pad movable toward and from the latter, a form carried by the presser member for cooperating with the pad to mold a sole on the form, a pair of sole positioning gages associated with said presser member and pivotally mounted for movements toward and from the opposite lateral margins of the sole, connections between said gages constraining them to move equally in opposite directions, means for yieldingly holding said gages against the sole, a bell-crank lever carried by said presser member, said lever comprising a latch mounted on said lever for pivotal movement about an axis at right angles to the axis of movement of the lever as a whole, a spring for moving said latch relatively to said lever in one direction, a lug on one of said gages to hold said latch against the action of said spring, means operable upon upward movement of said presser member for rocking said lever in one direction to allow said spring to move said latch into position behind said lug, and means operable upon downward movement of said presser member for rocking said lever in the opposite direction to cause said latch to retract said gages from the sole.

13. In a sole molding machine, a stationary pad, a form located beneath and movable toward and from said pad for cooperating with the latter in molding a sole, said form being provided with an upper molding surface having rearward and forward areas adapted to support the heel and ball portions respectively of a flat insole to be molded and having a longitudinally concave area between said heel and ball supporting areas adapted to be bridged by the sole, and a yieldable plunger projecting from the molding face of the pad and arranged to cooperate with said heel supporting area of said molding surface during the movement of the form toward the pad to clamp the sole against the form before the sole is engaged by the pad.

ANDREW EPPLER, Jr.